United States Patent
Agarwal et al.

(10) Patent No.: US 10,516,613 B1
(45) Date of Patent: Dec. 24, 2019

(54) NETWORK DEVICE STORAGE OF INCREMENTAL PREFIX TREES

(71) Applicant: Innovium, Inc., San Jose, CA (US)

(72) Inventors: Puneet Agarwal, Cupertino, CA (US); Rupa Budhia, San Jose, CA (US); Meg Lin, Saratoga, CA (US)

(73) Assignee: Innovium, Inc., San Jose, CA (US)

( * ) Notice: Subject to any disclaimer, the term of this patent is extended or adjusted under 35 U.S.C. 154(b) by 429 days.

(21) Appl. No.: 15/290,821

(22) Filed: Oct. 11, 2016

Related U.S. Application Data

(63) Continuation of application No. 14/883,588, filed on Oct. 14, 2015, now abandoned.

(51) Int. Cl.
*H04L 12/745* (2013.01)
*H04L 29/12* (2006.01)

(52) U.S. Cl.
CPC ........ *H04L 45/748* (2013.01); *H04L 61/2007* (2013.01)

(58) Field of Classification Search
CPC ........ G06F 3/0619; G06F 12/02; G06F 3/061; G06F 3/064; G06F 3/0644; G06F 3/065; G06F 3/067; G06F 3/0673; H04L 67/1095; H04L 67/1097; H04L 12/66; H04L 12/56; H04L 45/00; H04L 45/54; H04L 45/7457; H04L 49/3009; H04L 49/602; H04L 45/748; H04L 61/2007
See application file for complete search history.

(56) References Cited

U.S. PATENT DOCUMENTS 6,564,211 B1 * 5/2003 Andreev ............. G06F 16/9027
6,928,430 B1 * 8/2005 Chien ............... G06F 16/90344
(Continued)

FOREIGN PATENT DOCUMENTS

WO WO2011/078812 A1 * 6/2011

OTHER PUBLICATIONS

McAuley et al., presented in IEEE INFOCOM '93 The Conference on Computer Communications, Proceedings, Mar. 28-Apr. 1, 1993, titled Fast routing table lookup using CAMs, (McAuley hereinafter) was published as DOI: 10.1109/INFCOM.1993.253403.*
(Continued)

*Primary Examiner* — Christopher P Grey
(74) *Attorney, Agent, or Firm* — Wong & Rees LLP; Karl T. Rees

(57) ABSTRACT

Prefix entries are efficiently stored at a networking device for performance of a longest prefix match against the stored entries. A prefix entry generally refers to a data entry which maps a particular prefix to one or more actions to be performed by a networking device with respect to network packets or other data structures associated with a network packet that matches the particular prefix. In the context of a router networking device handling a data packet, the one or more actions may include, for example, forwarding a received network packet to a particular "next hop" networking device in order to progress the network packet towards its final destination, applying firewall rule(s), manipulating the packet, and so forth. To reduce a total amount of space occupied by a prefix tree in storage, each of the nodes of a prefix tree may be configured to store only an incremental portion of a prefix relative to its parent node.

31 Claims, 12 Drawing Sheets

(56) References Cited

U.S. PATENT DOCUMENTS

| | | | |
|---|---|---|---|
| 7,313,666 B1* | 12/2007 | Saminda De Silva | ...................... H04L 45/00 709/238 |
| 7,936,764 B1* | 5/2011 | Krishnan | ................ H04L 45/54 370/395.31 |
| 7,986,696 B1* | 7/2011 | Miliavisky | .............. H04L 45/54 370/392 |
| 9,596,181 B1* | 3/2017 | Goel | ...................... H04L 45/748 |
| 10,230,639 B1* | 3/2019 | Patil | ...................... H04L 45/748 |
| 2002/0131432 A1* | 9/2002 | Bachmutsky | ........... H04L 45/00 370/408 |
| 2004/0052251 A1* | 3/2004 | Mehrotra | ................ H04L 45/00 370/389 |
| 2004/0215609 A1* | 10/2004 | Takatsu | ................... H04L 45/00 |
| 2006/0253606 A1* | 11/2006 | Okuno | .................... H04L 45/02 709/238 |
| 2013/0031077 A1* | 1/2013 | Liu | .......................... G06F 7/02 707/706 |
| 2013/0297641 A1 | 11/2013 | Shinjo et al. | |
| 2014/0086249 A1* | 3/2014 | Assarpour | ........... H04L 45/7457 370/392 |
| 2015/0098470 A1* | 4/2015 | Sun | ....................... H04L 45/748 370/392 |
| 2017/0142013 A1 | 5/2017 | Zhang | |

OTHER PUBLICATIONS

Somnath Paul et al., titled "Reconfigurable Computing Using Content Addressable Memory for Improved Performance and Resource Usage", (Paul hereinafter) was published Jun. 8-13, 2008.*

Satendra Maurya et al., titled "Low Power Fast and Dense Longest Prefix Match Content Addressable Memory for IP Routers", (Maurya hereinafter) was published Aug. 19-21, 2009.*

Kostas Pagiamtzis et al., titled "Content-Addressable Memory (CAM) Circuits and Architectures: A Tutorial and Survey", (Pagiamtzis hereinafter) was published in IEEE Journal of Solid-State Circuits, vol. 41, No. 3, Mar. 2006.*

United States Patent and Trademark Office, U.S. Appl. No. 15/671,151, Notice of Allowance dated Oct. 10, 2018.

* cited by examiner

600 IP Routing Information Table

| 602 Entry | 604 Address Prefix | 606 Prefix Length | 608 Destination (IP NextHop) |
|---|---|---|---|
| 610A | 188.190.112.0 | 24 | NH100 |
| 610B | 188.190.103.0 | 24 | NH200 |
| 610C | 188.190.96.0 | 24 | NH300 |
| 610D | 188.190.0.0 | 16 | NH400 |
| 610E | 192.75.239.0 | 24 | NH500 |
| 610F | 192.9.0.0 | 16 | NH600 |
| 610G | 192.0.0.0 | 8 | NH700 |
| 610H | 192.9.2.0 | 24 | NH800 |

700 TCAM component

| 702 Storage Location | 704 Address Prefix | 706 Stored Mask | 708 Policy |
|---|---|---|---|
| 0 | 192.9.2.0 (610H) | 255.255.255.0 | NH800 |
| 1 | 188.190.103.0 (610E) | 255.255.255.0 | NH500 |
| 2 | 188.190.112.0 (610A) | 255.255.255.0 | NH100 |
| 3 | 188.190.103.0 (610B) | 255.255.255.0 | NH200 |
| 4 | 188.190.96.0 (610C) | 255.255.255.0 | NH300 |
| 5 | 188.190.0.0 (610D) | 255.255.0.0 | NH400 |
| 6 | 192.9.0.0 (610F) | 255.255.0.0 | NH600 |
| 7 | 192.0.0.0 (610G) | 255.0.0.0 | NH700 |

FIG. 8

800 TCAM component

| 804 Storage Location | 806 Address Prefix | 808 Stored Mask | 810 Policy |
|---|---|---|---|
| 0 | 188.190.0.0 | 255.255.0.0 | Matched Length = 16 bits; Go to SRAM Row 0 |
| 1 | 192.0.0.0 | 255.0.0.0 | Matched Length = 8 bits; Go to SRAM Row 1 |

802 SRAM component

| 812 Storage Location | Entry 0 | Entry 1 | Entry 2 | Entry 3 |
|---|---|---|---|---|
| 0 | (D) Address Prefix = 0 Match Length = 0 Dest = NH400 | (C) Address Prefix = 96 Match Length = 8 bits Dest = NH300 | (A) Address Prefix = 112 Match Length = 8 bits Dest = NH100 | (B) Address Prefix = 103 Match Length = 8 bits Dest = NH200 |
| 1 | (G) Address Prefix = 0 Match Length = 0 Dest = NH700 | (F) Address Prefix = 9 Match Length = 8 bits Dest = NH600 | (H) Address Prefix = 9.2 Match Length = 16 bits Dest = NH800 | (E) Address Prefix = 75.239 Match Length = 16 bits Dest = NH500 |

1102 Based on an identified input string, search a first memory component to select a prefix entry storing a first portion of a prefix that matches a first portion of the input string

1104 Search a storage location a second memory component to select a longest prefix match entry storing a second portion of the prefix that matches a second portion of the input string

NETWORK DEVICE STORAGE OF INCREMENTAL PREFIX TREES

PRIORITY CLAIM

This application claims benefit under 35 U.S.C. § 120 as a Continuation of application Ser. No. 14/883,588, filed Oct. 14, 2015, the entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

TECHNICAL FIELD

Embodiments relate generally to efficient storage of network address routing information across multiple memory components of a networking device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The transmission of data packets across a computing network typically involves a series of "hops" at a number of intermediary networking devices, often various types of routers, before each data packet reaches its destination. When each of these intermediary networking devices receives a data packet, the devices may be configured to perform any of a variety of actions with the data packet based on address information specified by the network packet, such as a source address, destination address, or path information. For example, an Internet Protocol (IP) data packet may include a destination IP address field within the header of the IP data packet, based upon which a network router may determine one or more other networking devices, among a number of possible other networking devices to forward the IP data packet to.

The information used by such networking devices to determine how to handle data packets based on specified address information is generally referred to herein as routing information, and is commonly represented in a table format. A table may associate an address with policy or rule information that dictates the actions that the router is to perform with any data packet that is associated with the address. Such a table may also be referred to as a policy table. A router may be configured to consult different types of tables for different purposes. For instance, a router may include one policy table describing policies to apply based on source address information at one network layer, another policy table describing policies to apply based on destination address information at another network layer, and yet other policy tables that serves yet other purposes.

Rather than including a separate record, or entry, for each possible address, a table may be configured such that each entry of the table specifies policy information for a different group of addresses. For example, each entry in an IP-based forwarding table may specify a group of IP addresses and a "next hop" device identifier, indicating that any data packet specifying a destination address that is a part of the specified group of IP addresses is to be forwarded to the specified next hop device. One common manner of specifying a group of addresses is by a common prefix that each of the addresses shares. Generally, a prefix is a first portion of a network address. A prefix may be of any length, and thus any given address may have, or "match," multiple prefixes. For example, the prefixes 192, 192.168, and 192.168.1 would all be valid prefixes for the address 192.168.1.1. Prefixes may be described with the routing information of a router in a variety of manners, some of which are described herein.

Many types of routers distribute a significant number of data packets on a nearly continuous basis. Thus, the speed at which networking devices are able to process received network packets can be of great importance. For these reasons and others, routing information and other similar data may be stored in a networking device using specialized high-speed memory components, such as content addressable memory (CAM). However, the use of such high-speed memory in networking devices is relatively expensive, both in terms of cost and power consumption. Thus, more efficient techniques for storing and searching routing information are desirable, particularly as the number of routing entries stored by a networking device grows large.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8 depicts an example of the IP prefix routes of FIG. 6 represented as an incremental prefix tree and stored across separate memory components of a networking device;

FIG. 11 is a flow diagram illustrating searching an incremental prefix tree stored across separate memory components.

DETAILED DESCRIPTION

Figure 1:
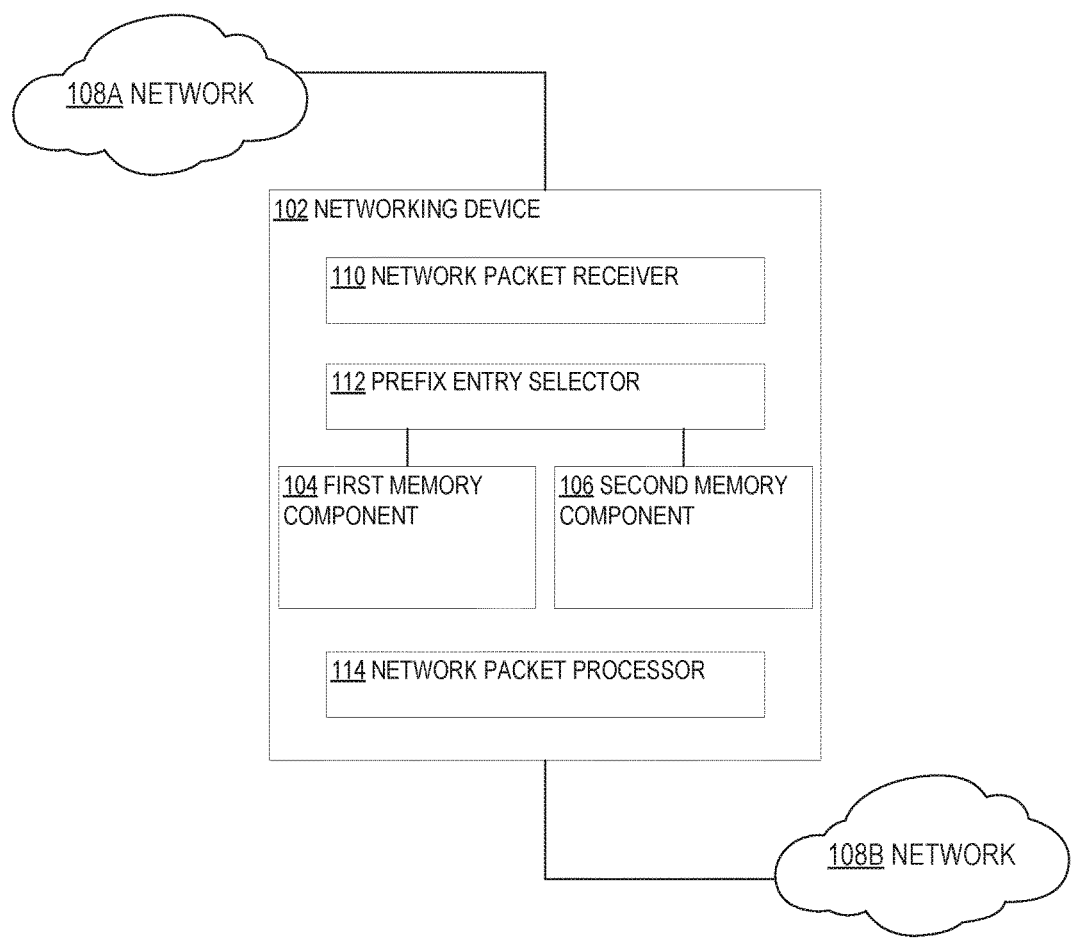
FIG. 1 depicts an example networking device upon which certain embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Functional Overview
   3.1. Longest Prefix Match
   3.2. Prefix Trees
   3.3. Incremental Prefix Trees
   3.4. Storing Incremental Prefix Trees
   3.5. Prefix Length-Specific Databases
4.0. Implementation Examples
5.0. Example Embodiments
6.0. Implementation Mechanism—Hardware Overview
7.0. Extensions and Alternatives

1.0. GENERAL OVERVIEW

Approaches, techniques, and mechanisms are disclosed for efficiently storing network address prefix entries at a networking device, and for performing longest prefix matching against stored entries. As used herein, a prefix entry generally refers to a data entry which maps a particular network address prefix to one or more actions to be performed by a networking device with respect to network packets or other data structures associated with a network address that matches the particular network address prefix. In the context of a router networking device handling a data packet, one or more actions may include, for example, forwarding a received network packet to a particular "next hop" networking device in order to progress the network packet towards its final destination(s), applying firewall rule(s), manipulating the packet, and so forth. For illustrative purposes, this disclosure describes a number of embodiments with respect to the context of forwarding policies that are applied based on matching destination IP addresses to IP prefixes. However, the same techniques are also applicable to applying any type of policy based on matching other types of prefixes to other type of network address information including, but not limited to, source or other IP addresses, media access control (MAC) addresses, proprietary network addresses, etc.

As indicated above, a particular prefix entry may be selected for a particular network packet if the prefix specified by the prefix entry "matches" an input string associated with the network packet (e.g., where the input string may be based on a network address, packet metadata, or any combination thereof). Each prefix generally consists of a pattern of bits representing a portion of a network address. For example, in the case of IP prefixes, a "slash notation", such as Classless Inter-Domain Routing notation, is used to express a portion of an IP address that constitutes a prefix portion of the IP address. One particular IP prefix may be expressed as "138.172.0.0/16", for example, where the "/16" syntax indicates that the first 16 bits of the IP address 138.172.0.0 (the "138.172" portion) are used to perform matches and that the remaining 16 bits (the "0.0" portion) represent a placeholder that is not used for matching. The prefix "138.172.0.0/16" thus matches the IP address "138.172.23.1" (because the first 16 bits of both the prefix and IP address—"138.172"—is the same), but the same prefix does not match the IP address "138.170.3.28". In other words, a prefix matches an address if the address contains the prefix.

In general, a set of prefix entries stored by a networking device may include one or more overlapping entries, meaning that multiple prefix entries may match the same network address. For example, a particular set of IP prefix entries stored by a networking device may include a first prefix entry specifying the prefix "178.0.0.0/8" and a second prefix entry specifying the prefix "178.132.2.0/24", each of which matches the IP address "178.132.2.11". In instances where multiple prefix entries match a particular network address, a networking device generally is configured to select the prefix entry specifying the longest prefix, also referred to as a longest prefix match.

In one embodiment, to facilitate searching a set of prefix entries stored by a networking device for a longest prefix matching of an address specified by or otherwise associated with a network packet, the set of prefix entries may be represented as a tree data structure, referred to herein as a prefix tree. To represent a set of prefix entries as a prefix tree, each prefix entry of the set is represented as a separate node in the tree and arranged such that any descendant nodes of each node share a common prefix portion, where the root node is associated with an empty string. For example, assuming a prefix set includes IP prefix entries corresponding to each of the prefixes "149.0.0.0/8" and "149.310.0.0/16," a corresponding prefix tree may include a node representing the "149.310.0.0/16" prefix arranged as a child node of a separate node representing the shorter "149.0.0.0/8" prefix. Because the nodes of a prefix tree arranged in this manner represent successively longer prefixes as the tree is descended from the root node, a longest prefix match for a particular input address may be found by traversing the tree from the root node for matching nodes, where the deepest node in the tree that matches the input address represents the longest prefix match.

In an embodiment, some or all of a prefix tree representing a set of prefix entries may be implemented in specialized hardware of a networking device to increase the speed with which the networking device is able to use the data to process network packets. As one example, a set of prefix entries represented as a prefix tree may be stored in a specialized type of memory (e.g., a content addressable memory (CAM), ternary content addressable memory (TCAM) component, etc.) which facilitates high speed searches for matching prefixes. However, such high speed memory components are often relatively expensive in terms of cost, area, and power, and reliance on such memory components to store an entire prefix tree is increasingly challenging as the number of prefix entries grows.

According to one embodiment, to reduce a total amount of space occupied by a prefix tree in storage, each of the nodes of a prefix tree may be configured to store only an incremental portion of a prefix relative to its parent node, instead of storing an entire prefix for each node. The representation of a prefix tree in this manner is referred to herein as an incremental prefix tree. Referring again to the example IP prefixes described above, an incremental prefix tree including nodes corresponding to the "149.0.0.0/8" and "149.310.0.0/16" prefixes may include a first node storing the "149.0.0.0" prefix, and may further include a child node of the first node storing the prefix portion "310.0.0", where the "310.0.0" prefix portion represents the incremental difference between the "149.0.0.0" and "149.310.0.0" prefixes. By storing only an incremental difference of each prefix with respect to the prefix of a node's parent node, an amount of storage space used to store a prefix tree may be reduced.

According to an embodiment, to further optimize use of storage components used to store an incremental prefix tree, an incremental prefix tree may be partitioned for storage across two or more separate memory components of a networking device. For example, an incremental prefix tree may be partitioned into at least two sections, where a first section of the prefix tree is stored in a specialized memory component (e.g., CAM, TCAM, etc.). The first section, for example, generally may correspond to nodes located close to the root node of the tree. Other sections of the prefix tree, generally representing nodes farther from the root node of the tree, may be stored in a separate memory component, such as a static random access memory (SRAM) component. Partitioning an incremental prefix tree across two or more separate memory components may enable storage of more frequently accessed portions of the tree (e.g., nodes closer to the root node) using a more expensive memory component, while less frequently accessed portions of the tree (e.g., nodes farther from the root node) are stored using less expensive memory components.

According to an embodiment, storage of a set of prefix entries may be further optimized by storing one or more subsets of the prefix entries in one or more prefix length-specific databases. Each of the subsets, for example, may contain a collection of prefix entries specifying a prefix of a particular prefix length that occurs frequently within the overall set of prefix entries. These prefix entries specifying prefixes of frequently occurring lengths may be selected for storage in the prefix length-specific databases before generating a prefix tree as described above, thereby reducing the number of nodes in the prefix tree and an amount of corresponding storage space. Furthermore, the prefix-length specific databases can be stored in relatively inexpensive memory components instead of consuming space in a higher cost memory component.

As one example of selecting one or more subsets of a set of prefix entries for storage in prefix length-specific databases, a hypothetical set of ten thousand prefix entries may include approximately three thousand entries specifying a prefix of length /24, two thousand entries specifying a prefix of length /16, and one thousand entries specifying a prefix of length /8, with the remaining entries spread across other prefix lengths. In this example, three separate prefix length-specific databases may be created: a /24 prefix length database, a /16 prefix length database, and a /8 prefix length database.

In other aspects, the invention encompasses a computer apparatus and a computer-readable medium configured to carry out the foregoing steps.

2.0. STRUCTURAL OVERVIEW

FIG. 1 illustrates an example networking device 102 upon which certain embodiments may be implemented. FIG. 1 represents one example embodiment that is provided for purposes of illustrating a clear example; other embodiments may use different arrangements.

The system of FIG. 1 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In an embodiment, a networking device 102 of FIG. 1 broadly represents any computing device capable of sending and receiving data over a computer network. Types of networking devices 102 generally may include a router, switch, hub, or any other type of computing device. In an embodiment, a networking device 102 is coupled to other computing devices (e.g., other routers, switches, hubs, or other computing devices) via one or more networks, such as networks 108A, 108B. Networks 108A, 108B broadly represent one or more LANs, WANs, cellular networks, and/or internetworks using any of wired, wireless, terrestrial microwave, or satellite links, and may include the public Internet. Networks 108A, 108B may represent different networks or may represent the same network.

In one embodiment, a networking device 102 includes a network packet receiver 110 that is configured to receive network packets from other devices. A network packet receiver 110, for example, may include a network interface controller and other hardware and software components that enable the networking device 102 to receive network packets from other devices coupled to the networking device 102 via one or more networks.

In one embodiment, a networking device 102 comprises at least two memory components, including a first memory component 104 and a second memory component 106. Each of the first memory component 104 and the second memory component 106 generally represents primary storage used by the networking device 102 to store various data used during device operation. In the context of a router, for example, first memory component 104 and second memory component 106 may store information representing one or more forwarding tables, routing tables, and/or other policy tables or data used by the router to perform various operations with respect to network packets received by the router.

In one embodiment, a first memory component 104 may be a specialized type of memory. Examples of a first memory component 104 may include, but are not limited to, a content addressable memory (CAM), a ternary content addressable memory (TCAM) component, or any other type of memory component. For example, TCAM is a specialized type of memory that is designed to perform certain types of data searches (e.g., longest prefix searches) in a highly efficient manner. Whereas standard memory (e.g., SRAM or DRAM) is configured to return data content located at a specified memory address, Content Addressable Memory (CAM) is configured to perform an inverse operation of returning a memory address of data that matches an input data string. In particular, a TCAM component is configured to store and search for data words consisting of "1"s and "0"s (e.g., traditional bit states), and a third "X" state that matches both "0" and "1". For example, a hypothetical TCAM may store a data word of "001X1X", which matches both of the input data words "001111" and "001011", but not the data word "101110". A TCAM component furthermore is configured to perform a search of the entire contents of the memory in a relatively small number of clock cycles. For these and other reasons, TCAM components may be used to store a set of network address prefixes (e.g., represented as a bit string and masked bits) and to perform fast searches for stored prefixes based on an input network address.

In an embodiment, a second memory component 106 represents one or more different types of memory components from the first memory component 104, such as one or more static random-access memory (SRAM) components. A second memory component 106 generally may be cheaper and consume less power than a TCAM memory component. Based on these considerations and others, a balance between usage of a first memory component and second memory components generally may be desired.

In one embodiment, a networking device 102 includes one or more prefix entry selectors 112 generally configured to select particular prefix entries from a set of entries stored across two or more memory components, such as a first memory component 104 and a second memory component 106 described above. The selection of particular prefix entries by a prefix entry selector 112 may include, for example, searching a TCAM component using a particular network address. For example, a prefix entry selector 112 may include logic configured to search a TCAM component by providing a network address as a query to find a prefix entry specifying the longest matching prefix. A prefix entry selector 112 may be further configured to match a network address against prefix entries stored in an SRAM component, or any other type of memory component storing prefix entries.

In one embodiment, a networking device 102 includes a network packet processor 114 configured to perform actions indicated by policy information specified in selected prefix entries with respect to network packets received by the networking device. For example, based on a prefix entry selected by a prefix entry selector 112 in response to receiving or generating a network packet, a network packet processor 114 may be configured to forward the network packet to another networking device, modify the network packet, drop the particular network packet, add or modify one or more security rules, increment one or more counters, or perform any other specified action or set of actions.

In an embodiment, some or all of a network packet receiver 110, prefix entry selector 112, and network packet processor 114 may, for example, be implemented by one or more Field Programmable Gate Arrays ("FPGA"), Application Specific Integrated Circuits ("ASIC"), or other specialized circuitry within a computing device configured to implement hardware-based logic such as described herein. In an embodiment, some or all of these components may instead be implemented by a general purpose processor configured to execute logic implemented by software-based instructions.

The system of FIG. 1 illustrates only one of many possible arrangements of components configured to provide the functionality described herein. Other arrangements may include fewer, additional, or different components, and the division of work between the components may vary depending on the arrangement.

3.0. FUNCTIONAL OVERVIEW

In an embodiment, a networking device 102 of FIG. 1 may be used to efficiently store and search for prefix entries used to process network packets received by the device. As described in the sections hereinafter, a set of prefix entries may be represented and stored as an incremental prefix tree to reduce an overall amount of storage space occupied by the data representing the prefix entries. Furthermore, storage of an incremental prefix tree in a networking device may be made more efficient by partitioning and storing the data representing the incremental prefix tree across two or more separate memory components.

3.1. Longest Prefix Match

Various computing devices and applications, and networking devices in particular, implement a longest prefix match algorithm to select a particular prefix from a set of prefixes based on a received input key. For example, some version of a longest prefix match algorithm is used in many networking applications to select a particular prefix entry from a stored set of entries to determine how to process network packets received by a networking device, among other uses.

At a high level, a longest prefix match algorithm receives an input "key," often comprising a string of numbers, letters, or bits, and determines which prefix from a set of prefixes is the longest prefix matching the input key. A prefix "matches" an input key for the purposes of a longest prefix match algorithm if the input key contains the prefix. Using an example of an input key and set of prefixes that each comprise a string of letters, each of the prefixes "a", "axj", and "axjiiab" matches a hypothetical input key "axjiiabpo", whereas the prefixes "axy", "bxji", and "xjiiab" do not match the input key.

Figure 2:
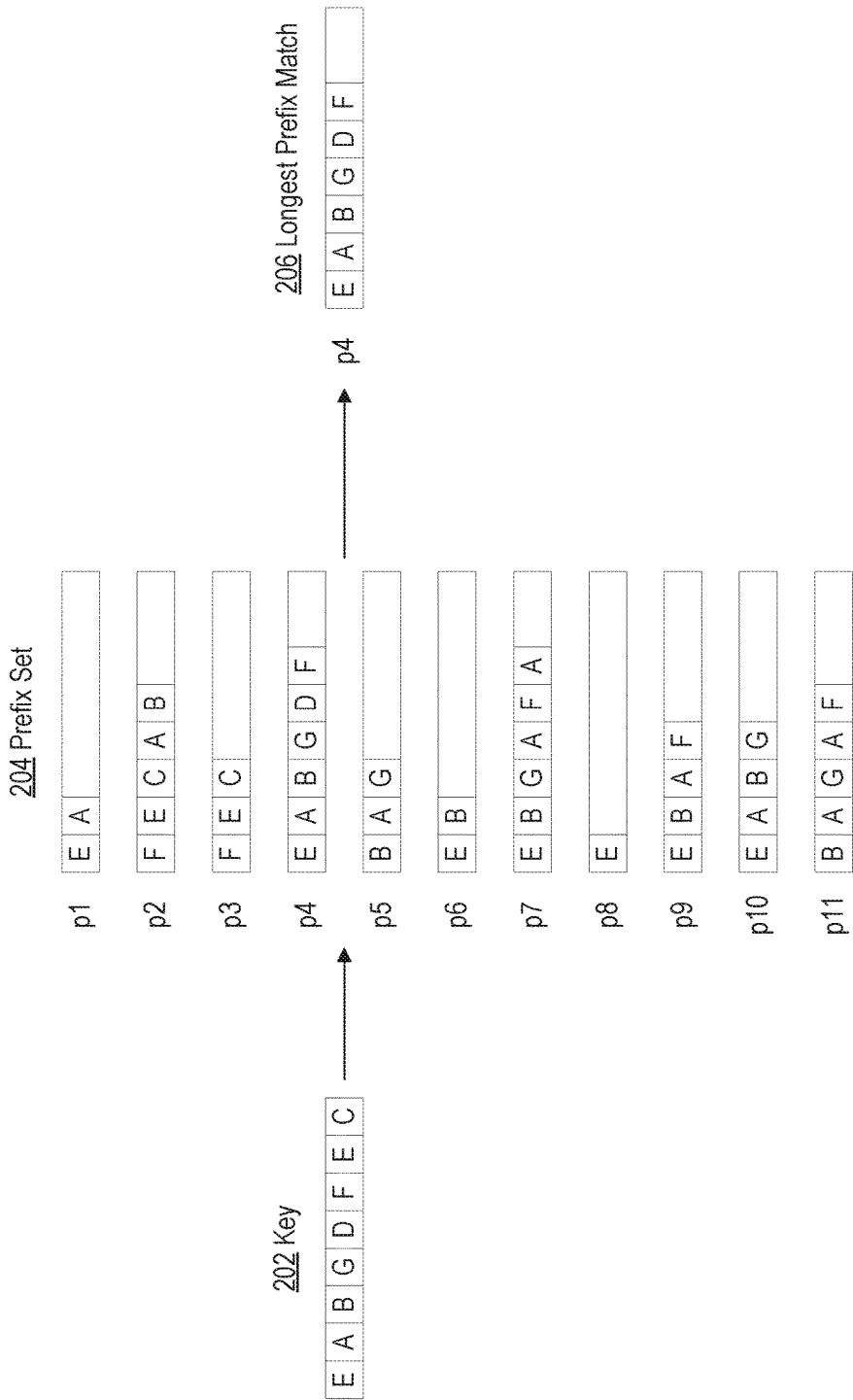
FIG. 2 depicts an example instance of a longest prefix matching algorithm.

FIG. 2 depicts an example instance of a longest prefix match algorithm. The example of FIG. 2 includes an input key 202, a prefix set 204, and a result 206. In the example of FIG. 2, each of the input key 202, prefixes p1-p11 of the prefix set 204, and the result 206 are depicted as a string of letters. Prefix set 204 represents a collection of prefixes, where each of the example prefixes p1-p11 represents a possible result of applying a longest prefix match algorithm based on a particular input key. In the example of FIG. 2, there are four (4) separate prefixes (p1, p4, p8, and p10) from the prefix set 204 that match the key 202. More specifically, the input key 202 "EABGDFEC" contains each of the prefixes "EA" (p1), "EABGDF" (p4), "E" (p8), "EABG" (p10) from the prefix set 204. The result of the longest prefix match algorithm selects the matching prefix of the longest length, corresponding to prefix "EABGDF" (p4) in the example of FIG. 2.

3.2. Prefix Trees

In one embodiment, a longest prefix match algorithm may be implemented by representing a prefix set (e.g., prefix set 204) using a tree data structure, referred to herein as a prefix tree. A prefix tree generally may be generated for use by a longest prefix match algorithm by representing each prefix of a prefix set as a node in the tree. The nodes of a prefix tree are arranged such that descendant nodes of each node in the tree share a common prefix, where the root node is associated with an empty string and each descending node has a longer prefix than its parent node.

Figure 3:
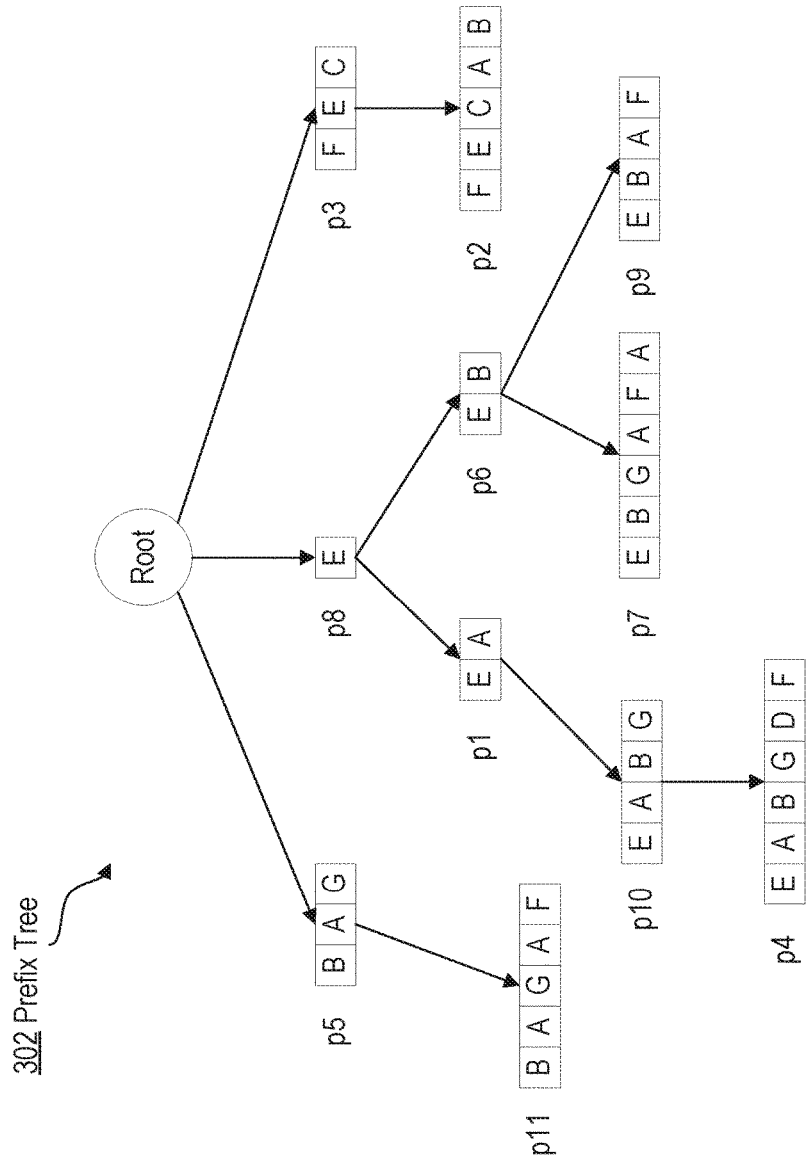
FIG. 3 depicts an example of a prefix tree including nodes representing prefixes from a prefix set.

FIG. 3 depicts an example of a prefix tree including nodes representing prefixes from a prefix set. In the example of FIG. 3, each of the nodes labeled p1-p11 of the prefix tree 302 corresponds to one of the prefixes from the prefix set 204 of FIG. 2. As indicated above, the nodes of the prefix tree 302 are arranged such that each node represents a prefix that contains the prefix represented by the node's parent node. For example, the p11 node of the example prefix tree 302 is a child node of the p5 node because the prefix represented by the p11 node ("BAGAF") contains the prefix represented by the p5 node ("BAG"). Similarly, the p10 node is a child node of p1 node because the prefix "EABG" contains the prefix "EA". Each of the nodes p3, p5, and p8 is a child node of the root node, representing the empty string " ", because each of those prefixes contains no other prefix from the prefix set 204.

In one embodiment, a prefix tree, such as prefix tree 302, may be used to determine a longest prefix match for an input key by starting at the root node and searching the tree downward for successively deeper nodes that match the input key. For example, a longest prefix match algorithm may first determine whether any node of the set of nodes of depth 1 from the root node represents a prefix that matches the input key. If a node of depth 1 matches the input key, then it is determined whether any of the child nodes of that node also matches the input key, and so forth. Because each successive child node in the tree represents a prefix that is longer than its parent node, the deepest node in the tree matching the input key represents the longest prefix match. Returning to the example input key 202 from FIG. 2, the input key "EABGDFEC" first matches the p8 node (because the input key "EABGDFEC" contains the prefix "E"), followed by the p1 node (because the input key "EABGD-FEC" also contains the prefix "EA"), followed by the p10 node (because the input key "EABGDFEC" also contains the prefix "EABG"), and finally matching the p4 node (because the input key "EABGDFEC" contains the prefix "EABGDF"), the p4 node corresponding to the longest prefix match for the input key 202.

3.3. Incremental Prefix Trees

In an embodiment, some or all of a prefix tree and associated prefix matching logic may be implemented in specialized hardware of a networking device to increase the speed with which the networking device is able to use the data to process network packets. For example, in reference to the prefix tree 302 of FIG. 3, prefix entries corresponding to each of the nodes p1-p11 may be stored in specialized memory components of a networking device.

The representation of a prefix set as a prefix tree, as depicted in FIG. 3, generally includes some redundant information. For example, the p5 node of the prefix tree 302 corresponds to the prefix "BAG", while its child p11 node corresponds to the prefix "BAGAF". Because each node of a prefix tree is arranged such that it contains the prefix of its parent node, the "BAG" portion of the p11 node is redundant of the same prefix portion "BAG" of the p5 node. As the number of nodes of a prefix tree increases, an amount of data corresponding to redundant prefix information may occupy a substantial amount of storage space in a networking device.

In one embodiment, to reduce an amount of storage space occupied by a prefix tree, each node of a prefix tree may be configured to store only an incremental portion of a prefix relative to the node's parent node. A prefix tree where each node is configured to store only an incremental portion of a prefix relative to its parent node is referred to herein as an "incremental prefix tree."

Figure 4:
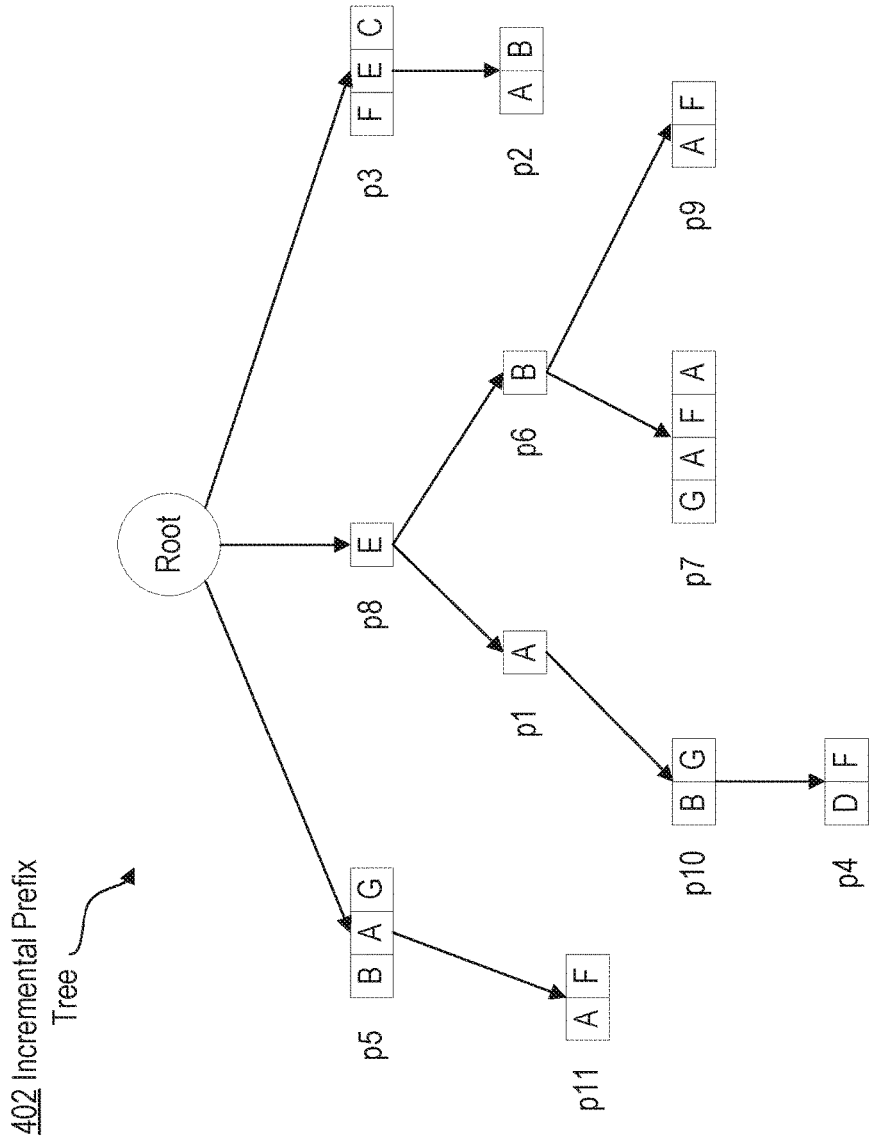
FIG. 4 depicts an example of an incremental prefix tree including nodes representing incremental prefixes from a prefix set.

FIG. 4 depicts an example of an incremental prefix tree including nodes representing incremental prefixes from a prefix set. Each of the nodes p1-p11 of FIG. 4 corresponds to the same nodes p1-p11 and associated prefixes of the prefix tree 302 in FIG. 3, except many of the nodes of the incremental prefix tree 402 store only an incremental portion of the associated prefix. For example, whereas the p11 node of the prefix tree 302 stores the entire prefix "BAGAF", the same p11 node of the incremental prefix tree 402 stores only an incremental portion of the prefix "BAGAF" with respect to p5 node, corresponding to the string "AF". Similarly, whereas the p7 node of the prefix tree 302 stores the entire prefix string "EBGAFA", the p7 node of the incremental prefix tree 402 stores only the incremental prefix portion "GAFA", representing an incremental difference with respect to its parent nodes p6 and p8. As the incremental prefix tree 402 of FIG. 4 illustrates, an amount of data stored by many of the nodes in the incremental prefix tree is smaller than the corresponding node of the full prefix tree of FIG. 3, and thus an overall amount of storage space occupied by an incremental prefix tree may be substantially smaller than a standard prefix tree.

3.4. Storing Incremental Prefix Trees

In one embodiment, to further optimize storage of prefix entries represented as a prefix tree, an incremental prefix tree may be partitioned into at least two separate sections, where each of the at least two separate sections is stored in a different memory component. For example, an incremental prefix tree may be partitioned such that a first section of the incremental prefix tree is stored in a specialized high speed memory component of a networking device, such as a TCAM component. The first section of the incremental prefix tree, for example, may correspond to a portion of the tree that includes frequently accessed nodes, such as the nodes located close to the root node. A second section of the incremental prefix tree, generally corresponding to nodes deeper in the tree and which are individually accessed less frequently, may be stored in a separate and less expensive memory component.

Figure 5:
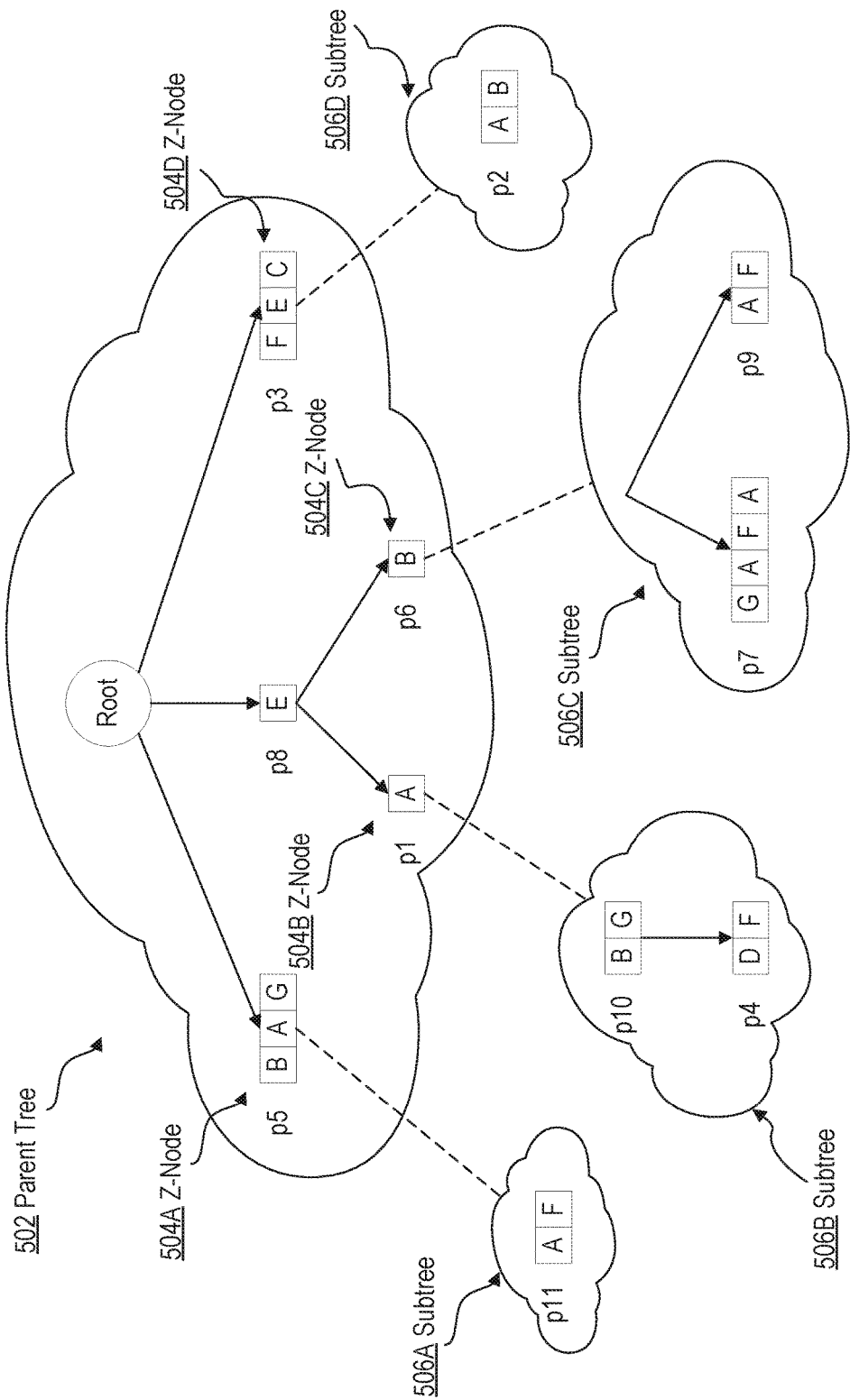
FIG. 5 depicts an example partitioning of an incremental prefix tree into a parent tree and a plurality of subtrees.

FIG. 5 depicts an example of an incremental prefix tree partitioned into a parent tree and a plurality of subtrees. The partitioned tree of FIG. 5 corresponds to the incremental prefix tree 402 depicted in FIG. 4, and includes a parent tree 502 and a plurality of subtrees 506A-506D. In FIG. 5, the parent tree 502 includes one or more levels of nodes descending from a root node, terminating at nodes 504A-504D, which may also referred to as "z-nodes". Each z-node of the parent tree 502 includes a reference to a particular subtree of subtrees 506A-506D, illustrated by a dashed line connecting each particular z-node to a particular subtree. For example, the z-node 504B, corresponding to the p1 node, includes a reference to the subtree 506B, which includes the nodes p10 and p4.

As indicated above, information represented by an incremental prefix tree may be stored across two or more memory components of a networking device. For example, the data comprising the nodes of parent tree 502, including references to particular subtrees and other associated information, may be stored in one memory component, while the subtrees 506A-506D may be stored in a second memory component. As further indicated above, the first memory component may be a specialized memory component, such as, without limitation, a TCAM component, while the second memory component is a different type of memory, such as, without limitation, SRAM. In general, a determination of which nodes of an incremental prefix tree are associated with a parent tree (and stored in one memory component), and which nodes are associated with the subtrees (stored in another memory component) may be based on any number of considerations including the total number of nodes in the tree, an amount of space available in each of the memory components, desired networking device performance characteristics, among other considerations.

Figure 6:
FIG. 6 depicts an example table of IP prefix routes.

FIG. 6 depicts an example table of IPv4 prefix routes. The IPv4 prefix routes may, for example, represent IPv4 routing information used by a networking device to process network packets received by the networking device. In one embodiment, the information comprising table 600 may be represented as an incremental prefix tree, as described in reference to FIG. 4, and partitioned into a parent tree and subtrees for storage across two or more separate memory components of a networking device, as described in reference to FIG. 5.

Table 600 of FIG. 6 includes a number of IPv4 prefix entries 602 labeled 610A-610H. Each IPv4 prefix entry in the table 600 indicates an address prefix 604, a prefix length 606, and a next hop destination 608. The combination of an address prefix 604 and prefix length 606 for each entry 602, for example, identifies a range of IPv4 addresses to which the entry applies. For example, entry 610A indicates an address prefix of "188.190.112.0" and a prefix length of 24 bits, which alternatively may be expressed in slash notation as "188.190.112.0/24". Similarly, entry 610D indicates an address prefix of "188.190.0.0" and a prefix length of 16, or "188.190.0.0/16" in slash notation. An example IPv4 address of "188.190.112.2" thus matches both of the 610A and 610D entries, where a longest prefix match algorithm selects the 610A entry for the example address.

Each prefix entry 602 in the table 600 further specifies a next hop destination 608, indicating a next hop for network packets specifying a destination address that matches a particular prefix entry. In the example table 600, each of the next hops 608 is identified by a logical name of a router or other networking device to which network packets are to be forwarded by the networking device. For example, entry 610F specifies a next hop destination of "NH600", which may identify a particular router to which network packets specifying a destination address that matches the address prefix "192.9.0.0/16" are to be forwarded. In general, a next hop destination may be specified using an IPv4 or IPv6 address, URL, or any other identifier. Furthermore, a table such as table 600 generally may indicate any type(s) of actions to perform relative to network packets matching each entry, including forwarding the packets to a particular device, manipulating the packets, adding or modifying one or more security rules, and/or any other processing steps.

Figure 7:
FIG. 7 depicts an example of the IP prefix routes of FIG. 6 stored as entries in a TCAM component of a networking device.

As indicated above, IP routing information, such as that illustrated by the table 600 of FIG. 6, may be stored by a networking device for use during device operation, and possibly stored in a specialized memory component of the networking device, such as a TCAM component. FIG. 7 depicts an example of the IP prefix routes specified in the table 600 of FIG. 6 stored as entries in a TCAM component of a networking device. Each of the entries depicted in FIG. 7 is identified by a storage location 702, and includes a particular address prefix 704, stored mask 706, and a policy 708.

Similar to the address prefix 604 and prefix length 606 fields of FIG. 6, a combination of the address prefix 704 and stored mask 706 fields of TCAM entries 700 identifies a range of IP addresses to which each entry applies. A policy field 708 stores information indicating one or more actions to be performed by a networking device when a packet specifying a destination address matching a particular entry is received. Similar to the table 600 of FIG. 6, for example, each of the entries is associated with a policy 708 that specifies a next hop destination for matching network packets. Although the policy 708 information is depicted as part of each entry, the policy information may be stored in a separate storage location, and entries in the TCAM may return a reference to a memory location storing the corresponding policy information.

In general, a TCAM component receives a data word input and searches its entire contents for a prefix entry that matches the input, generally returning the first stored entry that matches. In reference to the examples described above for IP routing information, the data word input may be a destination IP address specified by a network packet received by a networking device, and the result may be the first entry in the TCAM that matches the input. In an embodiment, the entries stored in a TCAM may be stored in a prioritized order such that entries corresponding to longer prefixes are returned before shorter prefixes that match the same input, corresponding to the operation of a longest prefix match algorithm.

As indicated above, as the number of prefix entries grows large, practical constraints on an amount of TCAM storage used to store the prefix entries may be reached. As described in reference to FIG. 4, the storage space of prefix entries may be reduced by representing the entries as an incremental prefix tree, where many nodes in the tree may store only an incremental portion of an associated prefix. Furthermore, as described in reference to FIG. 5, an incremental prefix tree may be partitioned into two or more sections, where each section is stored in a separate memory component of a networking device. To further illustrate these concepts, FIG. 8 depicts an example of the IP routing information of FIG. 6 represented as an incremental prefix tree and stored across separate storage components. The storage components of FIG. 8, for example, include a TCAM component 800 and a separate SRAM component 802. Although TCAM and SRAM components are used in the example of FIG. 8 and elsewhere, in general, any tiered set of memory components may be used. Furthermore, although FIG. 8 depicts policy information included as part of each prefix entry stored in the SRAM component 802, the policy information may be stored separately from the entries in the same or a different memory component.

In the example of FIG. 8, TCAM component 800 includes two entries, corresponding to the 610G and 610D entries from the table 600. Each entry in the TCAM component is stored at a particular storage location 804 and specifies an address prefix 806, a stored mask 808, and a policy 810. Although the address prefixes 806 illustrated in FIG. 8 include an entire IPv4 address (e.g., 188.190.0.0 in storage location 0), in other examples, only a portion of each prefix may be stored in a TCAM component 800. For example, storage location 0 may store only the address prefix portion "188.190" and storage location 1 may store only the address prefix portion "192". A policy 810 indicates both a matched length, indicating a number of bits of a prefix matched in the TCAM, and a reference to a storage location in the SRAM component 802 (e.g., "Go to SRAM Row 0"). The entries stored in the TCAM component 800, for example, may represent nodes of an incremental prefix tree comprising a "parent tree" section, whereas the entries stored in the SRAM component 802 represent nodes of a plurality of "subtrees," as illustrated by FIG. 5. These two entries in TCAM component 800, for example, represent the two topmost nodes of a prefix tree representing the information comprising the table 600 of FIG. 6. As indicated above, nodes closer to the root node of a corresponding prefix tree may be selected for storage in a TCAM component, for example, because these nodes are accessed more frequently when performing a search for a longest prefix match. In one embodiment, leaf nodes in the parent tree may be split into two or more z-nodes.

In an embodiment, whereas each of the storage locations of the TCAM component 800 stores data representing a single entry from table 600, each of the storage locations in the SRAM component stores multiple entries. For example, storage location 0 in the SRAM component 802 stores the entries 610A-610D from table 600. In an embodiment, an SRAM component 802 is able to store multiple entries at each storage location in part because the entries are stored according to an incremental prefix tree representation, reducing the amount of storage space occupied by each entry. For example, Entry 1 stored at storage location 0 in the SRAM component 802 stores the entry 610C from table 600. However, instead of storing the entire prefix for that entry ("188.190.96.0"), the entry stores only the incremental portion ("96") of the prefix relative to the TCAM entry that refers to that entry (the entry at storage location 0 that matches the prefix "188.190.0.0"). Each entry stored in the SRAM component 802 further includes policy information specifying one or more actions to perform relative to network packets matching the entry, for example, a destination address for forwarding the packets. However, as described above, the policy information may be stored together or separately from the prefix entries stored in the SRAM component 802.

3.5. Prefix Length-Specific Databases

In the examples described above, a collection of prefix entries may be represented as an incremental prefix tree and stored across two or more memory components of a networking device. As the number of prefix entries grows large, and a number of nodes in a corresponding prefix tree increases, it may be beneficial to further reduce the size of the prefix tree in storage. In one embodiment, to reduce a number of nodes stored as part of an incremental prefix tree, a subset of the prefix entries specifying prefixes of one or more frequently occurring prefix lengths are stored in one or more separate prefix length-specific databases. An incremental prefix tree then may be generated based on the remaining prefix entries after the entries specifying frequently occurring prefix lengths are removed from the initial collection, thereby reducing the number of nodes in the prefix tree.

Figure 9:
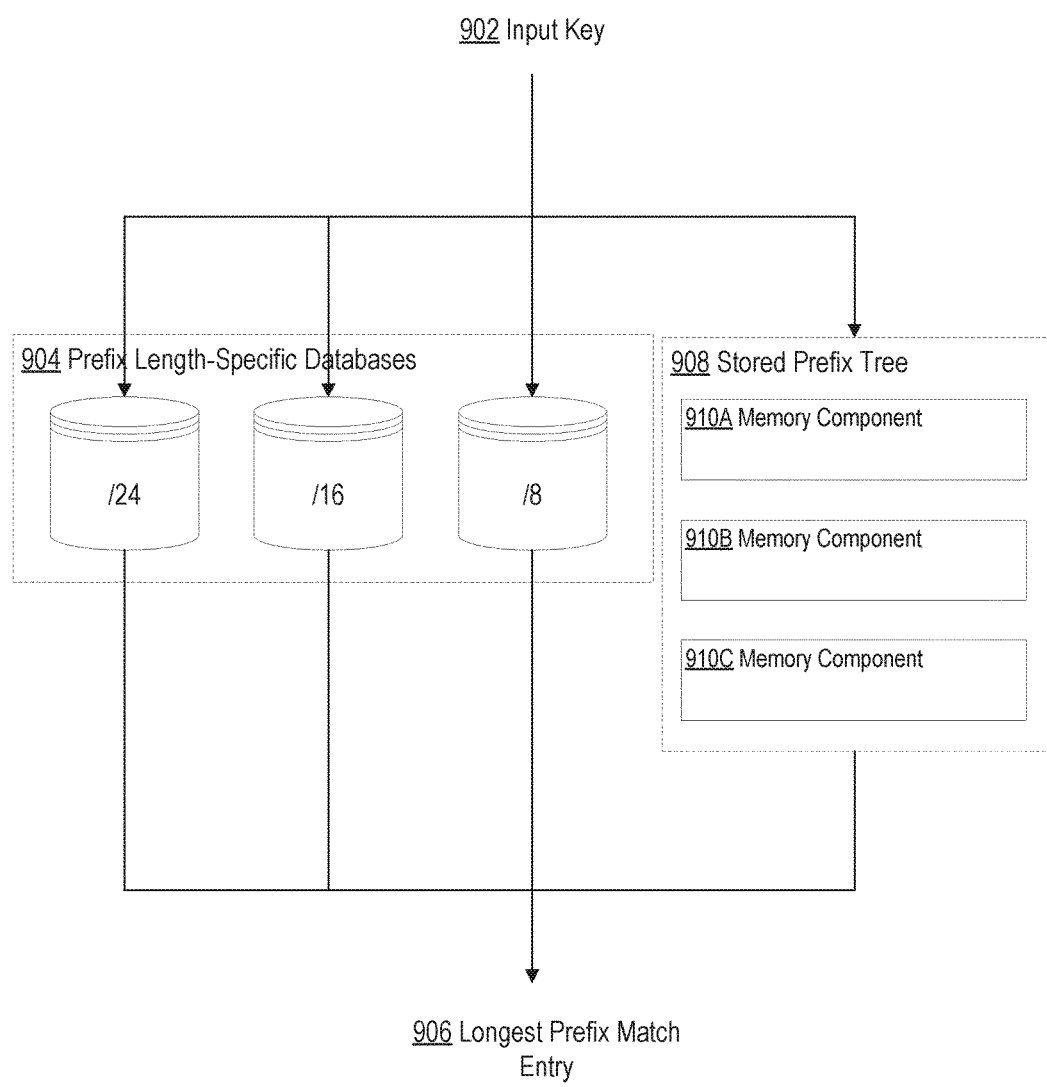
FIG. 9 depicts an example of searching for a longest prefix match based on IP prefix route entries stored in one or more prefix length-specific databases and an incremental prefix tree stored across separate memory components.

FIG. 9 depicts an example of storage components for storing a collection of prefix entries, including several prefix length-specific databases and separate memory components for storing an incremental prefix tree. In an embodiment, each prefix length-specific database 904 may be configured to store a subset of prefix entries from a collection of prefix entries, the subset of entries including entries specifying a prefix of a particular length. For example, a collection of prefix entries to be stored at a networking device may be analyzed to determine whether one or more particular prefix lengths frequently occur within the collection. A percentage threshold may be established, for example, and any set of prefix entries specifying a prefix of a particular prefix length that exceeds the threshold may be removed from the collection for storage in a prefix length-specific database.

In the example of FIG. 9, three separate prefix length-specific databases are configured, one for entries specifying prefixes of length /24, one for entries specifying prefixes of length /16, and one for entries specifying prefixes of length /8. Each of these prefix lengths, for example, may represent a significant portion of the total number of prefix entries to be stored at a networking device. As a hypothetical example, 30% of the entries from a collection of prefix entries may have specified prefixes of length /24, 15% of the entries may have specified prefixes of length /16, and 12% of the entries may have specified prefixes of length /8.

In one embodiment, prefix length-specific databases such as databases 904 may be stored in standard memory of a networking device and optimized for storage and searching of data entries of the same length. For example, when searching a prefix length-specific database based on a particular input key, it is unnecessary to locate a longest matching prefix in the database because all of the prefixes in the database are the same length. Instead, searching a prefix length-specific database involves searching for a single entry matching the input key, if any exist in the database.

FIG. 9 further provides a high level example of searching one or more prefix length-specific databases 904 and separately searching a stored prefix tree 908 (e.g., stored using memory components 910A-910C) for a longest prefix match entry 906 based on an input key 902. In one embodiment, an input key 902 (e.g., a network address specified by a received network packet) may be used to search in parallel each prefix length-specific database 904 and an incremental prefix tree stored across memory components 910A-910C, as described above. A prefix entry matching the input key 902 may be returned from one or more of the databases 904 and also from the stored incremental prefix tree 908. In FIG. 9, for example, a first matching prefix entry for an input key 902 may be found in the /24 database, a second matching prefix entry may be found in the /8 database (but no match found in the /16 database), and a third matching prefix entry may be found based on searching the incremental prefix tree 908 stored across memory components 910A-910C. In one embodiment, output from searching the stored incremental prefix tree 908 may include a value identifying the length of third matching prefix entry. A longest prefix match entry 906 may be determined by selecting the longest matching prefix entry from the set of matching prefix entries (e.g., the longest matching prefix from the first, second, and third matching prefix entries).

4.0. IMPLEMENTATION EXAMPLES

In one embodiment, an incremental prefix tree stored across two or more memory storage components and, optionally, storage of prefix entries in one or more prefix length-specific databases, as described above, may be used to efficiently perform a longest prefix match algorithm. In the context of a networking device 102, for example, the techniques described herein may be used to efficiently select a longest prefix match entry from a stored set of prefix entries based on an input string specified by a received network packet. For example, the input string may be a bit string based on a specified network address and/or any other data included in the network packet.

Figure 10:
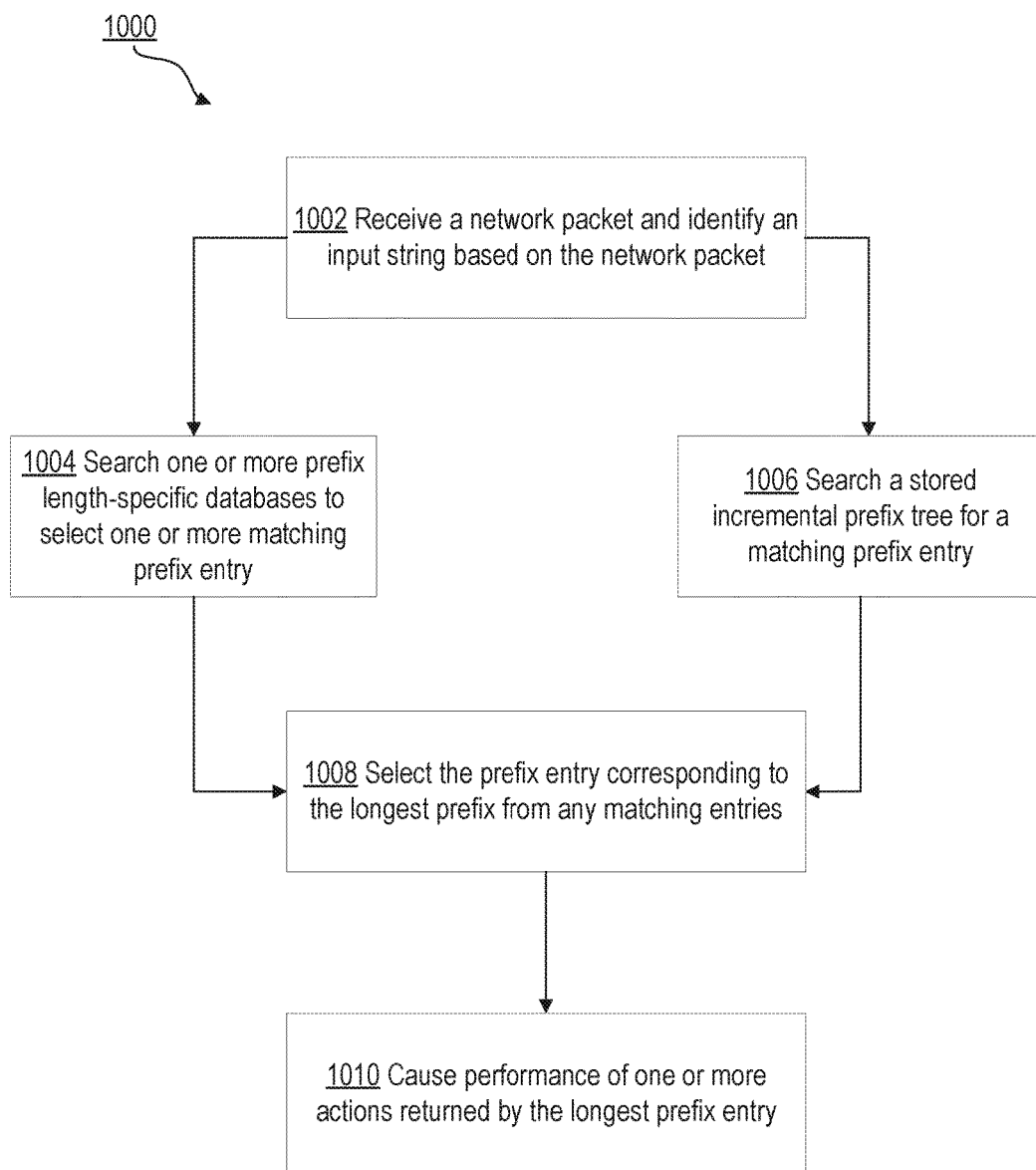
FIG. 10 is a flow diagram illustrating determining an action to perform with respect to a received network packet based on a selected IP routing entry from a set of entries stored across one or more prefix length-specific databases and two or more separate memory components.

FIG. 10 illustrates an example flow 1000 for selecting a longest prefix match entry from a set of prefix entries stored by a networking device, according to an embodiment. The various elements of flow 1000 may be performed in a variety of devices, including devices such as a networking device 102 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

At block 1002, a networking device receives a network packet and identifies an input string based on the network packet. In an embodiment, a networking device may identify an input string based on one or more values specified by the network packet (e.g., network addresses and/or other network packet metadata), metadata stored by the network device, or any combination thereof. For example, if the networking device is a router, the router may receive a network packet from another device, where the network packet specifies a destination address to which the router is responsible for forwarding the network packet. In other examples, an input string may be identified based on other data received by a computing device (e.g., based on a search string received by a search engine, a database query received by a database server, etc.).

In one embodiment, an input string may be identified by applying one or more operations to an initial data string. As one example, each input data string from a particular data source may include the same leading bits and, thus, the data strings may be truncated so that prefix matching is performed on only the variable portion of the input data strings.

More generally, for a given input data string, exact matching or wildcard matching may be performed on x number of leading bits and/or y number of trailing bits of the input data string (where x and/or y can be zero), and the remaining portion of the input data string may form the input data string used in the subsequent processing steps.

At block 1004, based on the identified input string, each of one or more prefix length-specific databases is searched for a matching prefix entry, if any prefix length-specific databases have been configured. As described above in Section 3.5, each of the prefix length-specific databases may be stored in memory of a networking device and configured to enable efficient searches for a prefix entry matching an input string. Because each of the prefix length-specific databases stores a set of prefix entries of the same length, a search based on the input string may return at most one result from each of the databases.

In an embodiment, a subset of prefix entries specifying prefixes of varying lengths may also be stored in a memory component of the networking device, where the prefix entries are matched using a conventional prefix matching process. The subset of prefix entries may be searched, for example, in parallel or otherwise in conjunction with the prefix entries stored in the prefix length-specific databases, as described above, and the prefix entries stored across multiple memory components, as described below.

At block 1006, based on the same input string, a search for a matching prefix entry is conducted against an incremental prefix tree stored across multiple memory components, such as a first memory component (e.g., a TCAM component) and a second memory component (e.g., an SRAM component). In an embodiment, a search for a matching prefix entry at block 1006 may be performed in parallel with a search for matching prefix entries in the prefix length-specific databases, described in reference to block 1004.

FIG. 11 is a flow diagram illustrating searching an incremental prefix tree stored across multiple memory components. At block 1102, based on the identified input string, selected first memory component is searched to select a prefix entry storing a first portion of a prefix that matches a first portion of the input string. For example, prefix matching logic of a networking device 102 may select the prefix entry by searching a TCAM component using the input string. As described above in reference to FIG. 7 and FIG. 8, a TCAM generally may be organized such that stored prefix entries specifying longer prefixes are returned before prefix entries specifying shorter prefixes if two or more prefix entries stored in the TCAM match the same input string, resulting in a longest prefix match being returned from the set of entries stored by the TCAM in response to a search.

A prefix entry selected from a first memory component may store different data depending on a particular implementation. In one embodiment, a prefix entry selected from the first memory component may specify the number of bits of the input string matched by the entry in the first memory component, and a value referring to a storage location in a second memory component of the networking device. The referenced storage location in the second memory component may store one or more separate prefix entries, where each of the prefix entries represents a node of a subtree referenced by the prefix entry returned by the first memory component. Referring to the example of the partitioned incremental prefix tree of FIG. 5, the prefix entry selected from the first memory component, for example, may correspond to a z-node from the parent tree of a partitioned incremental prefix tree, where the z-node refers to a particular subtree of a plurality of subtrees stored in a second memory component.

As another example, the prefix entry selected from the first memory component may specify only a value referring to a storage location in a second memory component of the networking device, the storage location in the second component storing the number of bits of the destination network address matched by the prefix entry in the first memory component, and one or more additional prefix entries, each of the additional prefix entries representing a node of a subtree referenced by the prefix entry selected from the first memory component.

As yet another example, the prefix entry selected from the first memory component may specify a value referring to a storage location in a second memory component of the networking device, where the referenced storage location in the second memory component specifies one or more actions to be performed by the networking device. For example, one or more particular prefix entries in the first memory component may represent a node of a corresponding prefix tree without a further subtree, meaning the prefix entry in the first memory component represents the longest prefix match entry for any network address matching the prefix entry. If it is determined that the particular prefix entry stored in the first memory component is the longest prefix match entry for the specified destination network address (e.g., by determining that the storage location in the second memory component contains only a specified set of actions), then the one or more actions may be performed by the networking device.

As yet another example, the prefix entry selected from the first memory component may specify a first value referring to a storage location in a second memory component of the networking device, where the referenced storage location in the second memory component may specify the number of bits of the input string matched by the entry in the first memory component, and a second value referring to yet another storage location in a third memory component of the networking device (which may be the same as the second memory component). The storage location referenced by the second value may store one or more separate sets of prefix entries, each of the separate sets of prefix entries representing nodes of a subtree referenced by the prefix entry selected from the first memory component. In this example, multiple storage locations in the second memory component can reference the same location in the third memory component and the storage location in the third memory component may store any number of different subtrees. Each of the first or second prefix entries may, for example, specify a subtree identifier indicating which of a plurality of subtrees to search in the storage location of the third memory component.

As yet another example, the prefix entry selected from the first memory component may specify a value referring to a storage location in a second memory component of the device, where the referenced storage location in the second memory component specifies (a) the number of bits of the input string matched by the entry in the first memory component, (b) a second value referring to yet another storage location in a third memory component of the device (which may be the same or a different memory component from the second memory component), and (c) one or more actions to be performed by the networking device. The storage location referenced by the second value may store one or more separate sets of prefix entries, each of the separate sets of prefix entries representing nodes of a subtree referenced by the prefix entry selected from the first memory component. In one embodiment, the actions in the second memory component may always be applied each time the corresponding storage location is referenced, or the actions may be applied only if no further match is found in the subtree.

As described above, generally a prefix entry selected from a first memory component (e.g., a TCAM component), or data stored at a storage location referenced by the prefix entry selected from the first memory component, includes a reference to a storage location in a second memory component (e.g., a SRAM component) of the networking device containing one or more additional prefix entries. At block 1104, based on the same input string specified by the network packet, a second prefix entry is selected from the storage location in the second memory component referenced by the first prefix entry. In an embodiment, the second prefix entry may be selected by comparing a second portion of the input string with a second portion of the address prefix not previously matched in the first memory component. A second portion of the input string may be determined, for example, based on information indicating a number of bits of the input string matched in the first memory component, where the information may be stored in either the first memory component or the second memory component. For example, in the case of an IPv4 network address, if the prefix entry selected from the memory component indicates that 12 bits of the destination network address were matched by the first prefix entry, prefix matching logic of the networking device can determine that up to 20 bits of the address remain to be matched in the second memory component.

In an embodiment, the second prefix entry selected from the second (or third) memory component may include at least (a) a second portion of the prefix that matches the input string, as described above, and (b) information indicating one or more actions. In one embodiment, the second prefix entry stores the second portion of the prefix, but does not store the first portion of the input string matched in the first memory component. This arrangement corresponds, for example, to an incremental prefix tree representation of the prefix entries, where only incremental portions of the prefixes are stored in the second memory component relative to the prefix portions stored in the first memory component. In an embodiment, the prefix entries stored at any particular storage location in the second memory component may be searched in parallel.

Referring again to FIG. 10, at block 1008, any resulting prefix entries from the searches conducted at block 1004 and at block 1006 are compared, and the prefix entry specifying the longest matching prefix is selected. This entry may be referred to as the longest prefix match entry. For example, if one prefix entry is returned from a /8 prefix length database, another prefix entry is return /24 prefix length database, and yet another prefix entry is returned from searching the stored incremental prefix tree specifying a prefix length of /20, then the prefix entry returned from the /24 prefix length database is selected as the longest prefix match entry.

At block 1010, the networking device performs the one or more actions indicated by the longest prefix match entry. Referring again to the data of FIG. 8, for example, the one or more actions may include forwarding instructions that instruct the networking device to forward the received network packet to another device, instructions to modify or filter the network packet, instructions to modify or create or one more security rules, or any other actions that may be performed by the networking device. For example, if the actions include forwarding instructions, the actions may identify a particular "next hop" address for the network packet to which a network packet processor 114 of a networking device 102 may forward the packet.

In the example described above in reference to FIG. 11, and as depicted by the data stored in FIG. 8, each of the prefix entries stored in the second memory component represents a leaf node of the associated prefix tree. However, in other examples, multiple levels of a prefix tree may be stored as prefix entries in the second memory component, where a matched prefix entry in the second memory component includes a reference to yet another storage location in the second memory component or another memory component containing a next set of prefix entries to search for matching prefix entries.

5.0. EXAMPLE EMBODIMENTS

Examples of some embodiments are represented, without limitation, in the following paragraphs:

According to some embodiments, an apparatus comprises: a prefix entry selector comprising: prefix matching logic configured to identify an input string based on received data; prefix matching logic further configured to search a first memory component to select a data entry storing a first portion of a data string that matches a first portion of the input string, the selected data entry returning a reference to a storage location in a second memory component; the prefix matching logic further configured to search the storage location in the second memory component to select a longest data string match entry storing a second portion of the data string that matches a second portion of the input string, the selected longest data string match entry returning data indicating one or more actions; wherein the longest data string match entry does not include the first portion of the data string; an action processor that causes performance of the one or more actions.

According to some embodiments, an apparatus comprises: a prefix entry selector comprising: prefix matching logic configured to identify an input string based on received data; prefix matching logic further configured to search a first memory component to select a data entry storing a first portion of a data string that matches a first portion of the input string, the selected data entry returning a reference to a storage location in a second memory component; wherein the storage location in the second memory component includes a second reference to a storage location in a third memory component; the prefix matching logic further configured to search the storage location in the third memory component to select a longest data string match entry storing a second portion of the data string that matches a second portion of the input string, the selected longest data string match entry returning data indicating one or more actions; wherein the longest data string match entry does not store the first portion of the prefix; an action processor that causes performance of the one or more actions.

According to some embodiments, a method comprises: identifying, based on data received by a computing device, an input string; searching a first memory component to select a data entry storing a first portion of a data string that matches a first portion of the input string, the selected data entry returning a reference to a storage location in a second memory component; searching the storage location in the second memory component to select a longest data string match entry storing a second portion of the data string that matches a second portion of the input string, the selected longest data string match entry returning data indicating one or more actions; wherein the longest data string match entry does not store the first portion of the data string; causing performance of the one or more actions.

According to some embodiments, a method comprises: identifying, based on data received by a computing device, an input string; searching a first memory component to select a data entry storing a first portion of a data string that matches a first portion of the input string, the selected data entry returning a reference to a storage location in a second memory component; wherein the storage location in the second memory component includes a second reference to a storage location in a third memory component; searching the storage location in the third memory component to select a longest data string match entry storing a second portion of the data string that matches a second portion of the input string, the selected longest data string match entry returning data indicating one or more actions; wherein the longest data string match entry does not store the first portion of the data string; causing performance of the one or more actions.

In some of the embodiments, the data string includes a network address prefix, the data entry is a prefix entry, and the longest data string match entry is a longest prefix match entry.

In some of the embodiments, the prefix entry selected from the first memory component represents a first node of a prefix tree, and wherein the prefix entry selected from the second memory component represents a second node of the prefix tree.

In some of the above embodiments, the computing device is a first networking device, and wherein the data indicating one or more actions includes an identifier of a second networking device different from the first networking device.

In some of the above embodiments, the data received by the computing device includes a network packet; and wherein the one or more actions includes one or more of: forwarding the network packet to a networking device, discarding the network packet, modifying the network packet, incrementing a counter, creating a new security rule, modifying an existing security rule, and assigning metadata to the network packet.

In some of the above embodiments, the storage location in the second memory component stores a plurality of prefix entries including the longest prefix match entry.

In some of the above embodiments, the method further comprises: searching, based on the input string, one or more prefix length-specific databases, each prefix length-specific database storing at least one prefix entry storing a prefix of a particular length and data indicating one or more actions.

In some of the above embodiments, the method further comprises analyzing a set of prefix entries to identify one or more frequently occurring prefix lengths; based on identifying the one or more frequently occurring prefix lengths, creating one or more prefix length-specific databases, each prefix length-specific databases storing at least one prefix entry storing a prefix of a particular length and data indicating one or more actions; searching the one or more prefix length-specific databases to select one or more matching prefix entries; wherein selecting the longest prefix match entry includes determining that the longest prefix match entry corresponds to a prefix that is longer than the prefixes stored by the one or more matching prefix entries selected from the one or more prefix length-specific databases.

In some of the above embodiments, the first memory component stores an ordered set of prefix entries including the selected prefix entry.

In some of the above embodiments, the first memory component stores an ordered set of prefix entries including the selected prefix entry, and wherein the second memory component is a static random access memory (SRAM).

In some of the above embodiments, the first memory component is a ternary content addressable memory (TCAM) and the second memory component is a static random access memory (SRAM).

In some of the above embodiments, the data received by the computing device includes a network packet, and wherein the input string is based on a network address specified by the network packet.

In some of the above embodiments, wherein the data received by the computing device includes a network packet, and wherein the input string is based on metadata associated with the network packet.

In some of the above embodiments, the storage location in the third memory component stores a plurality of prefix entries including the longest prefix match entry.

In some of the above embodiments, a plurality of storage locations in the second memory component include a reference to a same storage location in the third memory component.

In some of the above embodiments, a plurality of storage locations in the second memory component include a reference to a same storage location in the third memory component storing a plurality of prefix entries; wherein each prefix entry of the plurality of prefix entries stored at the same storage location in the third memory component includes an identifier of a subtree to which the prefix entry belongs.

In some of the above embodiments, wherein the first memory component is a ternary content addressable memory (TCAM), the second memory component is a first static random access memory (SRAM), and the third memory component is a second SRAM separate from the first SRAM.

In some of the above embodiments, the first memory component is a ternary content addressable memory (TCAM), and wherein the second memory component and the third memory component are the same static random access memory (SRAM).

In some of the above embodiments, the storage location in the second memory component further includes a number of bits matched by the first portion of the prefix stored by the prefix entry selected from the first memory component.

According to some embodiments, a method comprises searching one or more prefix length-specific databases and receiving results from said searching without necessarily performing other techniques described herein. For example, the routing device may initially consult the described prefix length-specific databases to speed up searches for frequently utilized prefixes, and then search for less frequently-used prefix entries in a table stored in only a single memory component, or in other storage arrangements that do not necessarily involve storing separate portions of a prefix in separate prefix entries.

Other examples of these and other embodiments are found throughout this disclosure.

6.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 12:
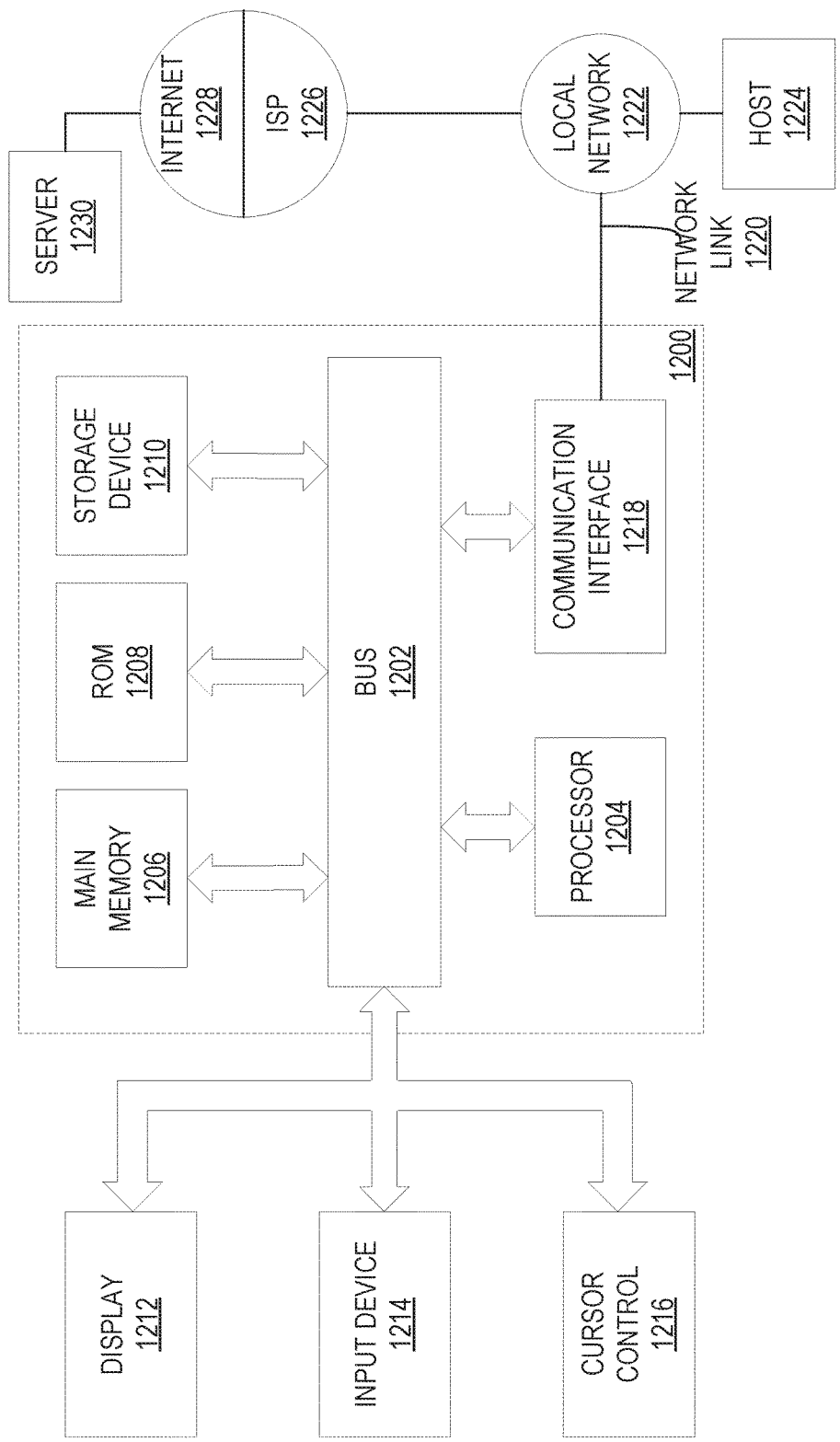
FIG. 12 is block diagram of a computer system upon which embodiments of the invention may be implemented.

FIG. 12 is a block diagram that illustrates a computer system 1200 utilized in implementing the above-described techniques, according to an embodiment. Computer system 1200 may be, for example, a desktop computing device, laptop computing device, tablet, smartphone, server appliance, computing mainframe, multimedia device, handheld device, networking apparatus, or any other suitable device.

Computer system 1200 includes one or more busses 1202 or other communication mechanism for communicating information, and one or more hardware processors 1204 coupled with busses 1202 for processing information. Hardware processors 1204 may be, for example, a general purpose microprocessor. Busses 1202 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1200 also includes a main memory 1206, such as a random access memory (RAM) or other dynamic or volatile storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes one or more read only memories (ROM) 1208 or other static storage devices coupled to bus 1202 for storing static information and instructions for processor 1204. One or more storage devices 1210, such as a solid-state drive (SSD), magnetic disk, optical disk, or other suitable non-volatile storage device, is provided and coupled to bus 1202 for storing information and instructions.

Computer system 1200 may be coupled via bus 1202 to one or more displays 1212 for presenting information to a computer user. For instance, computer system 1200 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1212 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1212.

One or more input devices 1214 are coupled to bus 1202 for communicating information and command selections to processor 1204. One example of an input device 1214 is a keyboard, including alphanumeric and other keys. Another type of user input device 1214 is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. Yet other examples of suitable input devices 1214 include a touch-screen panel affixed to a display 1212, cameras, microphones, accelerometers, motion detectors, and/or other sensors. In an embodiment, a network-based input device 1214 may be utilized. In such an embodiment, user input and/or other information or commands may be relayed via routers and/or switches on a Local Area Network (LAN) or other suitable shared network, or via a peer-to-peer network, from the input device 1214 to a network link 1220 on the computer system 1200.

A computer system 1200 may implement techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and use a modem to send the instructions over a network, such as a cable network or cellular network, as modulate signals. A modem local to computer system 1200 can receive the data on the network and demodulate the signal to decode the transmitted instructions. Appropriate circuitry can then place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

A computer system 1200 may also include, in an embodiment, one or more communication interfaces 1218 coupled to bus 1202. A communication interface 1218 provides a data communication coupling, typically two-way, to a network link 1220 that is connected to a local network 1222. For example, a communication interface 1218 may be an integrated services digital network (ISDN) card, cable modem, satellite modem, or a modem to provide a data communication connection to a corresponding type of telephone line. As another example, the one or more communication interfaces 1218 may include a local area network (LAN) card to provide a data communication connection to a compatible LAN. As yet another example, the one or more communication interfaces 1218 may include a wireless network interface controller, such as a 802.11-based controller, Bluetooth controller, Long Term Evolution (LTE) modem, and/or other types of wireless interfaces. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by a Service Provider 1226. Service Provider 1226, which may for example be an Internet Service Provider (ISP), in turn provides data communication services through a wide area network, such as the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

In an embodiment, computer system 1200 can send messages and receive data, including program code and/or other types of instructions, through the network(s), network link 1220, and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. As another example, information received via a network link 1220 may be interpreted and/or processed by a software component of the computer system 1200, such as a web browser, application, or server, which in turn issues instructions based thereon to a processor 1204, possibly via an operating system and/or other intermediate layers of software components.

In an embodiment, some or all of the systems described herein may be or comprise server computer systems, including one or more computer systems 1200 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   identifying, based on data received by a computing device, an input string, the data received by the computing device including a network packet, the input string based on metadata associated with the network packet;

searching a first memory component to select a data entry storing a first portion of a data string that matches a first portion of the input string, the selected data entry returning a reference to a storage location in a second memory component;

searching the storage location in the second memory component to select a longest data string match entry storing a second portion of the data string that matches a second portion of the input string, the selected longest data string match entry returning data indicating one or more actions;

wherein the longest data string match entry does not store the first portion of the data string;

causing performance of the one or more actions.

2. The method of claim 1, wherein the data string includes a network address prefix, the data entry is a prefix entry, and the longest data string match entry is a longest prefix match entry.

3. The method of claim 2, wherein the prefix entry selected from the first memory component represents a first node of a prefix tree, and wherein the longest prefix match entry selected from the second memory component represents a second node of the prefix tree.

4. The method of claim 2, wherein the storage location in the second memory component stores a plurality of prefix entries including the longest prefix match entry.

5. The method of claim 2, further comprising:
analyzing a set of prefix entries to identify one or more frequently occurring prefix lengths;
based on identifying the one or more frequently occurring prefix lengths, creating one or more prefix length-specific databases, each prefix length-specific database storing at least one prefix entry storing a prefix of a particular length and data indicating one or more actions;
searching the one or more prefix length-specific databases to select one or more matching prefix entries;
wherein selecting the longest prefix match entry includes determining that the longest prefix match entry corresponds to a prefix that is longer than the prefixes stored by the one or more matching prefix entries selected from the one or more prefix length-specific databases.

6. The method of claim 2, wherein the first memory component stores an ordered set of prefix entries including the selected prefix entry.

7. The method of claim 2, wherein the first memory component stores an ordered set of prefix entries including the selected prefix entry, and wherein the second memory component is a static random access memory (SRAM).

8. The method of claim 1, wherein the computing device is a first networking device, and wherein the data indicating one or more actions includes an identifier of a second networking device different from the first networking device.

9. The method of claim 1,
wherein the one or more actions includes one or more of: forwarding the network packet to a networking device, discarding the network packet, modifying the network packet, incrementing a counter, creating a new security rule, modifying an existing security rule, or assigning metadata to the network packet.

10. The method of claim 1, further comprising searching, based on the input string, one or more prefix length-specific databases, each prefix length-specific database storing at least one prefix entry, the at least one prefix entry storing a prefix of a particular length and data indicating one or more actions.

11. The method of claim 1, wherein the first memory component is a ternary content addressable memory (TCAM) and the second memory component is a static random access memory (SRAM).

12. The method of claim 1, wherein the metadata upon which the input string is based is a network address specified by the network packet.

13. A method, comprising:
identifying, based on data received by a computing device, an input string, the data received by the computing device including a network packet, the input string based on metadata associated with the network packet;
searching a first memory component to select a data entry storing a first portion of a data string that matches a first portion of the input string, the selected data entry returning a reference to a storage location in a second memory component;
wherein the storage location in the second memory component includes a second reference to a storage location in a third memory component;
searching the storage location in the third memory component to select a longest data string match entry storing a second portion of the data string that matches a second portion of the input string, the selected longest data string match entry returning data indicating one or more actions;
wherein the longest data string match entry does not store the first portion of the data string;
causing performance of the one or more actions.

14. The method of claim 13, wherein the data string includes a network address prefix, the data entry is a prefix entry, and the longest data string match entry is a longest prefix match entry.

15. The method of claim 14, wherein the storage location in the third memory component stores a plurality of prefix entries including the longest prefix match entry.

16. The method of claim 14, wherein a plurality of storage locations in the second memory component include a reference to a same storage location in the third memory component storing a plurality of prefix entries;
wherein each prefix entry of the plurality of prefix entries stored at the same storage location in the third memory component includes an identifier of a subtree to which the prefix entry belongs.

17. The method of claim 14, wherein the first memory component stores an ordered set of prefix entries including the selected prefix entry.

18. The method of claim 14, further comprising:
analyzing a set of prefix entries to identify one or more frequently occurring prefix lengths;
based on identifying the one or more frequently occurring prefix lengths, creating one or more prefix length-specific databases, each prefix length-specific database storing at least one prefix entry storing a prefix of a particular length and data indicating one or more actions;
searching the one or more prefix length-specific databases to select one or more matching prefix entries;
wherein selecting the longest prefix match entry includes determining that the longest prefix match entry corresponds to a prefix that is longer than the prefixes stored by the one or more matching prefix entries selected from the one or more prefix length-specific databases.

19. The method of claim 13, wherein a plurality of storage locations in the second memory component include a reference to a same storage location in the third memory component.

20. The method of claim 13, wherein the first memory component is a ternary content addressable memory (TCAM), the second memory component is a first static random access memory (SRAM), and the third memory component is a second SRAM separate from the first SRAM.

21. The method of claim 13, wherein the first memory component is a ternary content addressable memory (TCAM), and wherein the second memory component and the third memory component are the same static random access memory (SRAM).

22. The method of claim 13, wherein the metadata upon which the input string is based is a network address specified by the network packet.

23. The method of claim 13, wherein the storage location in the second memory component further includes a number of bits matched by the first portion of the data string stored by the data entry selected from the first memory component.

24. An apparatus, comprising:
a prefix entry selector comprising:
prefix matching logic configured to identify an input string based on received data, the received data including a network packet, the input string based on metadata associated with the network packet;
the prefix matching logic further configured to search a first memory component to select a data entry storing a first portion of a data string that matches a first portion of the input string, the selected data entry returning a reference to a storage location in a second memory component;
the prefix matching logic further configured to search the storage location in the second memory component to select a longest data string match entry storing a second portion of the data string that matches a second portion of the input string, the selected longest data string match entry returning data indicating one or more actions;
wherein the longest data string match entry does not include the first portion of the data string;
an action processor that causes performance of the one or more actions.

25. The apparatus of claim 24, wherein the data string includes a network address prefix, the data entry is a prefix entry, and the longest data string match entry is a longest prefix match entry.

26. The apparatus of claim 25, wherein the prefix entry selected from the first memory component represents a first node of a prefix tree, and wherein the longest prefix match entry selected from the second memory component represents a second node of the prefix tree.

27. The apparatus of claim 24, wherein the first memory component is a ternary content addressable memory (TCAM) and the second memory component is a static random access memory (SRAM).

28. An apparatus, comprising:
a prefix entry selector comprising:
prefix matching logic configured to identify an input string based on received data, the received data including a network packet, the input string based on metadata associated with the network packet;
prefix matching logic further configured to search a first memory component to select a data entry storing a first portion of a data string that matches a first portion of the input string, the selected data entry returning a reference to a storage location in a second memory component;
wherein the storage location in the second memory component includes a second reference to a storage location in a third memory component;
the prefix matching logic further configured to search the storage location in the third memory component to select a longest data string match entry storing a second portion of the data string that matches a second portion of the input string, the selected longest data string match entry returning data indicating one or more actions;
wherein the longest data string match entry does not store the first portion of the data string;
an action processor that causes performance of the one or more actions.

29. The apparatus of claim 28, wherein the data string includes a network address prefix, the data entry is a prefix entry, and the longest data string match entry is a longest prefix match entry.

30. The apparatus of claim 28, wherein the first memory component is a ternary content addressable memory (TCAM) and the second memory component is a static random access memory (SRAM).

31. One or more non-transitory computer-readable media storing instructions that, when executed by one or more computing devices, cause performance of:
identifying, based on data received by a computing device, an input string, the data received by the computing device including a network packet, the input string based on metadata associated with the network packet;
searching a first memory component to select a data entry storing a first portion of a data string that matches a first portion of the input string, the selected data entry returning a reference to a storage location in a second memory component;
searching the storage location in the second memory component to select a longest data string match entry storing a second portion of the data string that matches a second portion of the input string, the selected longest data string match entry returning data indicating one or more actions;
wherein the longest data string match entry does not store the first portion of the data string;
causing performance of the one or more actions.

* * * * *